United States Patent
Cavaleiro et al.

(10) Patent No.: US 12,286,538 B2
(45) Date of Patent: Apr. 29, 2025

(54) MODIFIED PIGMENTS AND USE THEREOF

(71) Applicant: Evonik Operations GmbH, Essen (DE)

(72) Inventors: Pedro Cavaleiro, Viersen (DE); Matthias Bouwman, Singapore (SG); Pascal Senter, Duisburg (DE); Philippe Favresse, Ratingen (DE)

(73) Assignee: Evonik Operations GmbH, Essen (DE)

(*) Notice: Subject to any disclaimer, the term of this patent is extended or adjusted under 35 U.S.C. 154(b) by 946 days.

(21) Appl. No.: 17/158,498

(22) Filed: Jan. 26, 2021

(65) Prior Publication Data

US 2021/0163751 A1 Jun. 3, 2021

Related U.S. Application Data

(62) Division of application No. 16/044,960, filed on Jul. 25, 2018, now abandoned.

(30) Foreign Application Priority Data

Jul. 26, 2017 (EP) .................................... 17183262

(51) Int. Cl.
| | |
|---|---|
| C09D 133/06 | (2006.01) |
| C09B 67/06 | (2006.01) |
| C09B 67/18 | (2006.01) |
| C09B 67/46 | (2006.01) |
| C09D 7/63 | (2018.01) |
| C09D 175/04 | (2006.01) |

(52) U.S. Cl.
CPC ........ *C09B 67/002* (2013.01); *C09B 67/0003* (2013.01); *C09B 67/0089* (2013.01); *C09B 67/009* (2013.01); *C09D 7/63* (2018.01); *C09D 133/06* (2013.01); *C09D 175/04* (2013.01)

(58) Field of Classification Search
CPC .............. C09B 67/002; C09B 67/0003; C09B 67/0089; C09B 67/009; C09D 133/06; C09D 175/04; C09D 7/63
USPC ........................................................ 524/217
See application file for complete search history.

(56) References Cited

U.S. PATENT DOCUMENTS

| | | | |
|---|---|---|---|
| 7,442,724 B2 | 10/2008 | Esselborn et al. | |
| 7,722,714 B2 | 5/2010 | Michael et al. | |
| 7,838,603 B2 | 11/2010 | Schwab et al. | |
| 8,202,935 B2 | 6/2012 | Alzer et al. | |
| 8,283,040 B2 | 10/2012 | Spyrou et al. | |
| 8,420,731 B2 | 4/2013 | Cavaleiro et al. | |
| 8,722,836 B2 | 5/2014 | Knott et al. | |
| 8,871,322 B2 | 10/2014 | Groenewolt et al. | |
| 9,115,335 B2 | 8/2015 | Troisin et al. | |
| 9,738,797 B2 | 8/2017 | Nilewski et al. | |
| 10,010,838 B2 | 7/2018 | Favresse et al. | |
| 2002/0096089 A1 | 7/2002 | Bergemann et al. | |
| 2005/0085563 A1 | 4/2005 | Esselborn et al. | |
| 2005/0183628 A1* | 8/2005 | Lchmann | C09D 7/45 106/31.77 |
| 2005/0287300 A1 | 12/2005 | Herrwerth et al. | |
| 2006/0183815 A1 | 8/2006 | Cavaleiro et al. | |
| 2007/0197678 A1 | 8/2007 | Cavaleiro et al. | |
| 2007/0199477 A1 | 8/2007 | Hill et al. | |
| 2007/0203307 A1 | 8/2007 | Cavaleiro et al. | |
| 2007/0240618 A1 | 10/2007 | Rohr et al. | |
| 2008/0200576 A1 | 8/2008 | Seller et al. | |
| 2008/0221276 A1 | 9/2008 | Schwab et al. | |
| 2009/0068435 A1 | 3/2009 | Christian et al. | |
| 2009/0120328 A1 | 5/2009 | Michael et al. | |
| 2010/0093884 A1 | 4/2010 | Spyrou et al. | |
| 2010/0197858 A1 | 8/2010 | Cavaleiro et al. | |
| 2010/0216943 A1 | 8/2010 | Cavaleiro et al. | |
| 2010/0261201 A1 | 10/2010 | Katanaev et al. | |
| 2011/0144269 A1 | 6/2011 | Kuppert et al. | |
| 2012/0037036 A1 | 2/2012 | Veit et al. | |
| 2012/0121845 A1 | 5/2012 | Groenewoll et al. | |
| 2013/0096244 A1* | 4/2013 | Schwarz-Barac | C08L 33/10 264/328.18 |
| 2013/0281552 A1 | 10/2013 | Nilewski et al. | |
| 2014/0274863 A1 | 9/2014 | Troisin et al. | |

(Continued)

FOREIGN PATENT DOCUMENTS

| | | |
|---|---|---|
| DE | 10 2004 019 560 | 11/2005 |
| DE | 10 2007 018 812 | 10/2008 |

(Continued)

OTHER PUBLICATIONS

Heinz Becker, et al., "Practical Handbook of Organic Chemistry", Organicum, 1973, 745 pages.
European Search Report dated Feb. 7, 2018, issued in European Application 17183262.9, filed Jul. 26, 2017 (8 pages).
Brock, Groteklaes, Mischke, Lehrbuch der Lacktechnologie [Coatings Technology], Vincentz Verlag Hannover 1998, pp. 240-256.
Brock, Groeteklaes and Mischke, Lehrbuch der Lacktechnologie [Paint Technology], 4th revised edition, Vincentz Network, Hannover, Germany, 2012, 5 pages.
C. Hansen, The Three Dimensional Solubility Parameter and Solvent Diffusion Coefficient: Their Importance in Surface Coating Formulation, Copenhagen, Danish Technical Press, 1967, 103 pages.
U.S. Appl. No. 11/720,286, filed Nov. 25, 2005, 2008/0200579, Seiler et al.

(Continued)

*Primary Examiner* — Kelechi C Egwim
(74) *Attorney, Agent, or Firm* — Grüneberg and Myers PLLC

(57) ABSTRACT

A modified organic pigment can be used to make a coating composition, such as a paint, a varnish, or a printing ink. The modified organic pigment is obtained by reacting the pigments during the pigment synthesis with one interface-active compound, where the interface-active compound is a compound within a three-dimensional Hansen space determined by three coordinates, Hansen solubility parameters (HSPs), D=18.21, P=8.44, H=13.16 with a radius of 6.7 units about a center of the three-dimensional Hansen space, determined with the aid of the HSPiP software, version 5.0.0.4.

15 Claims, 3 Drawing Sheets

(56) References Cited

U.S. PATENT DOCUMENTS

| | | |
|---|---|---|
| 2015/0197648 A1* | 7/2015 | Watanabe .............. C09D 11/36 524/505 |
| 2016/0160050 A1 | 6/2016 | Kido et al. |
| 2016/0264793 A1* | 9/2016 | Caes .................... C09D 11/033 |
| 2016/0369120 A1 | 12/2016 | Lacy et al. |
| 2017/0274335 A1 | 9/2017 | Favresse et al. |
| 2018/0010007 A1 | 1/2018 | Roland et al. |
| 2018/0028994 A1 | 2/2018 | Favresse et al. |
| 2018/0094146 A1 | 4/2018 | Aitha et al. |

FOREIGN PATENT DOCUMENTS

| | | |
|---|---|---|
| EP | 1 566 413 | 8/2005 |
| EP | 1 595 909 | 11/2005 |
| EP | 1 634 940 | 3/2006 |
| EP | 2 369 054 | 9/2011 |
| EP | 2 600 198 | 6/2013 |
| EP | 2 896 666 | 7/2015 |
| EP | 3 266 834 | 1/2018 |
| JP | 2005-60701 | 3/2005 |
| JP | 2007-530753 | 11/2007 |
| JP | 2012-41341 | 3/2012 |
| JP | 2014-19770 | 2/2014 |
| WO | 2003/039716 | 5/2003 |
| WO | 2007/060070 | 5/2007 |
| WO | 2007/060255 | 5/2007 |
| WO | 2007/115750 | 10/2007 |
| WO | 2008/049679 | 5/2008 |
| WO | 2008/074564 | 6/2008 |
| WO | 2008/091524 | 7/2008 |
| WO | 2010/046181 | 4/2010 |
| WO | 2010/054711 | 5/2010 |
| WO | 2012/004257 | 1/2012 |
| WO | 2015/093387 | 6/2015 |

OTHER PUBLICATIONS

U.S. Appl. No. 11/509,741, filed Aug. 25, 2006, 2007/0199477, Hill et al.

U.S. Appl. No. 11/677,244, filed Feb. 21, 2007, 2007/0197678, Cavaleiro et al.

U.S. Appl. No. 11/677,821, filed Feb. 22, 2007, 2007/0203307, Cavaleiro et al.

U.S. Appl. No. 12/682,126, filed Sep. 22, 2008, 2010/0216943, Cavaleiro et al.

U.S. Appl. No. 13/058,372, filed Jul. 16, 2009, 2011/0144269, Kuppert et al.

U.S. Appl. No. 13/205,834, filed Aug. 9, 2011, 2012/0037036, Veit et al.

U.S. Appl. No. 15/447,424, filed Mar. 2, 2017, 2017/0274335, Favresse et al.

U.S. Appl. No. 15/724,510, filed Oct. 4, 2017, 2018/0094146, Aitha et al.

* cited by examiner

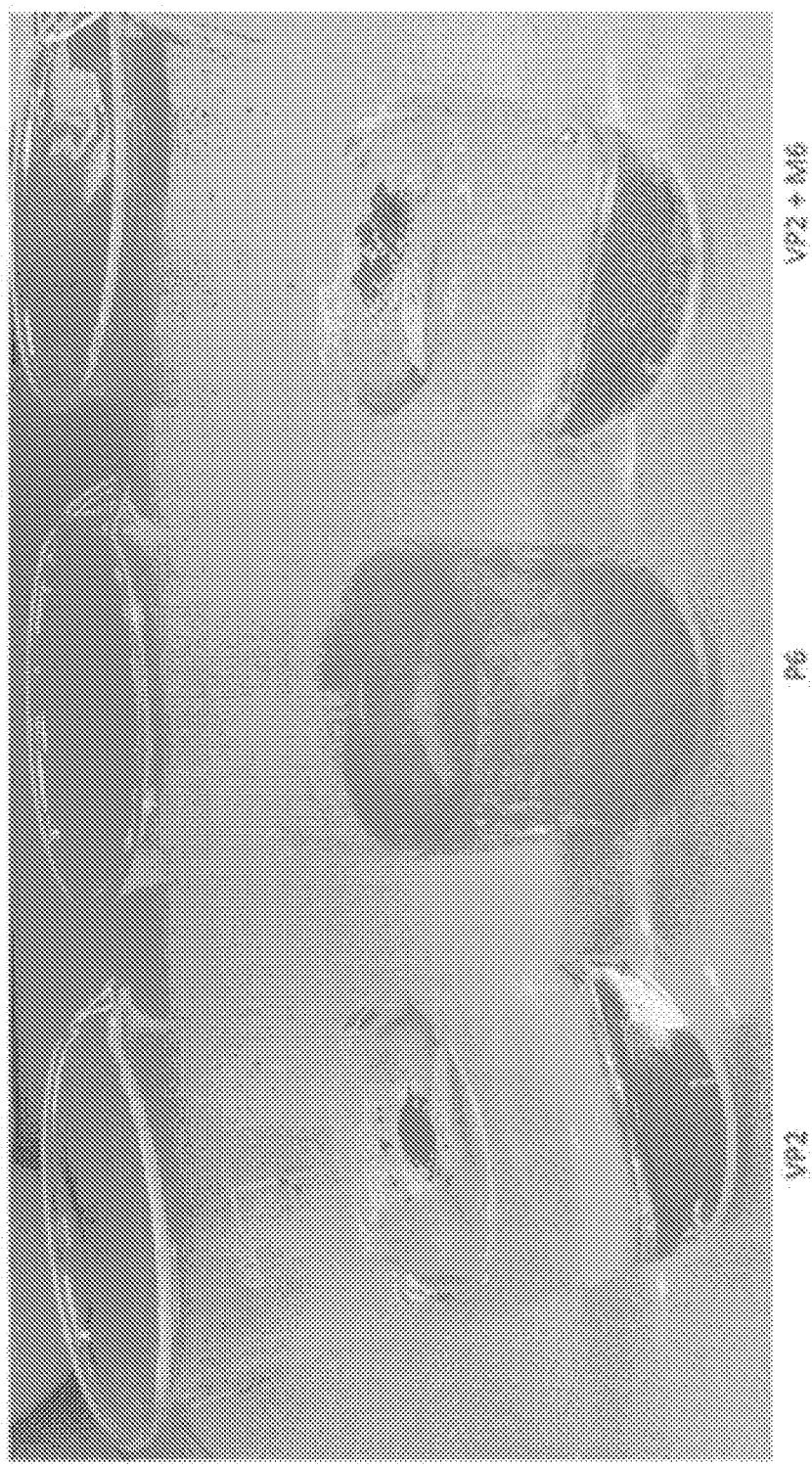

MODIFIED PIGMENTS AND USE THEREOF

CROSS-REFERENCE TO RELATED APPLICATIONS

This application is a divisional of U.S. application Ser. No. 16/044,960, filed on Jul. 25, 2018, which claims the benefit of European Patent Application No. 17183262.9, filed on Jul. 26, 2017. The content of each of these applications is hereby incorporated by reference in its entirety.

BACKGROUND OF THE INVENTION

Field of the Invention

The present invention relates to modified organic pigments, and to the production and use thereof in paints, varnishes, printing inks and other coating materials.

Discussion of the Background

Pigments are colouring substances present in insoluble dispersed form in the application medium. Application media are, for example, organic solvents, paints, varnishes, pigment preparations, printing inks and other coatings in which the pigment is incorporated. Typically, the crude pigments formed in the synthesis are ground or comminuted. There are various known fine distribution methods for conversion of a crude pigment to pigment or pre-pigment form, called dry grinding and wet grinding methods. In the dry and wet grinding methods, use of grinding bodies results in abrasion and hence introduction of extraneous substances into the product.

In other known processes for production of particulate pigments, the pulverulent pigments are produced by reactions in the gas phase, in a flame, by sol-gel processes, in the plasma or by desublimation. However, particles of small diameter have a particularly high tendency to agglomerate and therefore have to be stabilized.

The stabilization of the pigments is of great significance in the coatings industry, since pigments, being an important formulation constituent, determine the visual appearance and the physicochemical properties of a coating. In order that they can display their action to an optimal degree in the coating, they have to be homogeneously and finely distributed in the varnish during the dispersion process. The distribution has to be stabilized, in order that this state is maintained in the course of production, storage, processing and subsequent film formation. Recombination of the primary particles and aggregates can lead to formation of sediment, increasing viscosity, losses of gloss, inadequate colour depth, low hiding capacity, phase separation of the pigments and poor reproducibility of colour shades.

For the reliable dispersion and stabilization of pigments in coating systems, dispersants are generally used, in order thus to achieve maximum levels of filling. Being surface-active materials, the dispersants wet and cover the surface of the particles to be dispersed, and stabilize them against unwanted reagglomeration.

Application media and coating systems are used as synonyms in the context of the present invention.

Pigments in aqueous pigment preparations are stabilized exclusively by wetting agents and dispersants, whereas dispersion in solventborne pigment preparations is often promoted by dispersing resins (Brock, Groteklaes, Mischke, Lehrbuch der Lacktechnologie [Coatings Technology], Vincentz Verlag Hannover 1998, p. 240).

Furthermore, the prior art discloses putting particulate pigments into a state from which they can be processed further as easily as possible.

For example, WO 03/039716 describes an apparatus and a process for production of nanoparticulate pigments, in which a preliminary pigment material is evaporated and then condensed and collected in a collecting fluid.

The problem addressed by the present invention is that of modifying organic pigments in such a way that they can be easily dispersed and simultaneously have a high colour intensity, with no requirement for any additional grinding step by comparison with the production of the corresponding pigments.

The literature discloses that wetting agents and dispersants can be classified in various ways. The classifications of these are defined according to the chemical structure or are divided into ionic and nonionic products. Other classifications are guided by the fields of use (aqueous and nonaqueous) or by the pigment group (organic and inorganic). Separation according to molecular size is also conceivable (low or high molecular weight). Owing to the complexity of amphiphilic substances which additionally also fulfil unique functions, it is not easy to develop a simple model concept.

It has been found that the modification of the organic pigments having improved colour properties works with some wetting agents and dispersants, but not with others, even though the chemical structure thereof was similar.

The problem addressed by the present invention was therefore also that of determining or defining wetting agents and dispersants with which the modification of the organic pigments could be assured.

SUMMARY OF THE INVENTION

This and other objects have been achieved by the present invention described at least in the following embodiments.

1. Modified organic pigments obtainable by reacting the pigments during the pigment synthesis with at least one interface-active compound, where the interface-active compounds are selected such that they are within a three-dimensional Hansen space, where the Hansen space is determined by three coordinates, called the Hansen solubility parameters (HSPs), D=18.21, P=8.44, H=13.16 with a radius of 6.7 units about the centre, preferably D=18.21, P=8.44, H=13.16 with a radius of 5.5 units about the centre, more preferably D=18.21, P=8.44, H=13.16 with a radius of 5.0 units about the centre, with the aid of the HSPiP software, version 5.0.0.4.

2. Modified organic pigments according to Embodiment 1, characterized in that the interface-active compounds are chemical amphiphilic, ionic, nonionic compounds of low and/or high molecular weight.

3. Modified organic pigments according to Embodiment 1, characterized in that the interface-active compounds are polyether-modified fatty acids, polyether-modified fatty acid amide amines, polyether-modified amine derivatives, Jeffamine derivatives, polyether-modified oils and fats and derivatives thereof.

4. Modified organic pigments according to Embodiment 1, characterized in that the interface-active compounds are phosphorylated polyether derivatives, especially based on fatty alcohols.

5. Modified organic pigments according to Embodiment 1, characterized in that the interface-active compounds are polyether-modified styrene-maleic acid copolymers and maleate resins.

6. Modified organic pigments according to Embodiment 1 or 2, characterized in that the compounds have one or more functionalities having an affinity for the pigment surface.

7. Modified organic pigments according to Embodiment 1, characterized in that the organic pigments are selected from the group of the azo, diazo, condensed azo, naphthol, metal complex, thioindigo, indanthrone, isoindanthrone, anthanthrone, anthraquinone, isodibenzanthrone, triphendioxazine, quinacridone, perylene, diketopyrrolopyrrole and phthalocyanine pigments.

8. Modified organic pigments according to any of the preceding Embodiments, characterized in that the modified pigments comprise 5% to 50% by weight, preferably 10% to 40% by weight, more preferably 14% to 35% by weight, of interface-active compounds based on 100% by weight of the modified organic pigments.

9. Process for producing the modified organic pigments according to any of the preceding Embodiments, comprising the following component steps:
  1) synthesizing the crude pigments
  2) working up the crude pigments by washing and filtration
  3) drying the crude pigments, with addition of the interface-active compounds during the synthesis of the crude pigments, after the synthesis of the crude pigments or after the workup of the crude pigments.

10. Process according to Embodiment 9, characterized in that the addition of the interface-active compounds takes place before the drying of the crude pigments.

11. Process according to Embodiment 9, characterized in that the addition of the interface-active compounds is conducted in aqueous solution, preferably in alkaline solution.

12. Use of the modified organic pigments according to any of the preceding Embodiments for production of pigment preparations.

13. Use of the modified organic pigments according to any of the preceding Embodiments for production of paints, varnishes, printing inks, coating materials, floor coatings, potting compounds and filling compounds.

BRIEF DESCRIPTION OF THE SEVERAL VIEWS OF THE DRAWINGS

FIG. 3 shows the dispersibility of the pigments according to the invention in water.

DETAILED DESCRIPTION OF THE INVENTION

Any ranges mentioned herein below include all values and subvalues between the lowest and highest limit of this range.

As used herein, the singular form of a term includes the plural form, and the plural form of a term includes the singular form.

One embodiment relates to modified organic pigments according to the present invention. The modified organic pigments according to the invention are obtainable by reacting the pigments during the pigment synthesis with at least one interface-active compound, where the interface-active compounds are selected such that they are within a three-dimensional Hansen space, the Hansen space being defined by three coordinates, called the Hansen solubility parameters (HSPs), $D=18.21$, $P=8.44$, $H=13.16$ with a radius of 6.7 units about the centre, preferably $D=18.21$, $P=8.44$, $H=13.16$ with a radius of 5.5 units about the centre, more preferably $D=18.21$, $P=8.44$, $H=13.16$ with a radius of 5.0 units about the centre, with the aid of the HSPiP software, version 5.0.0.4.

The radius (distance) from the centre of the Hansen space can be calculated by means of the vector geometry. Vector geometry (also called "analytical geometry") is concerned with linear calculations in spaces and is known to those skilled in the art.

Figure 1:
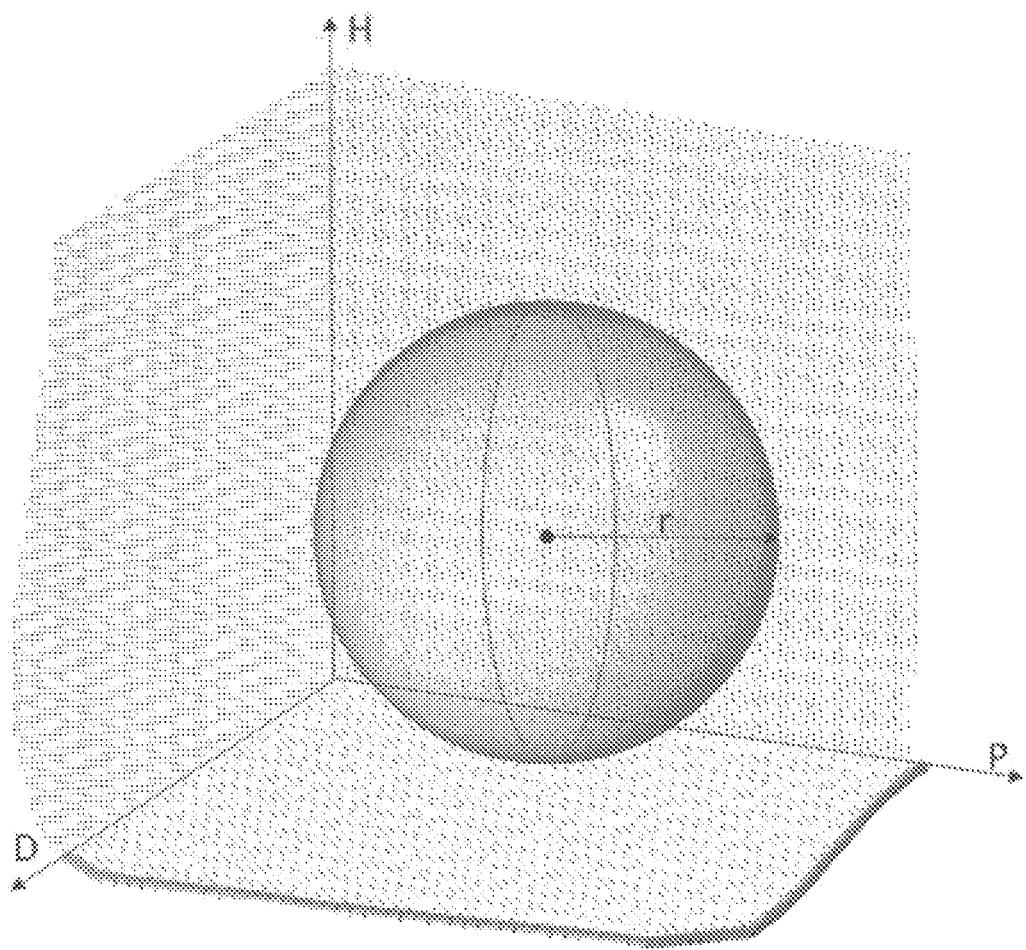
FIG. 1 shows a schematic diagram of the Hansen space according to the invention.

FIG. 1 shows a schematic diagram of the Hansen space according to the invention. It has been found that only the interface-active compounds within the three-dimensional Hansen space according to the invention are suitable for the reaction.

Pigments having interface-active compounds outside the Hansen space according to the invention do not have better colour quality.

The definition of the solubility parameters according to Hansen is known to those skilled in the art and was elucidated in his work, "The Three Dimensional Solubility Parameter and Solvent Diffusion Coefficient, Their Importance In Surface Coating Formulation", by Charles M. Hansen Danish Technical Press, Copenhagen, 1967.

The Hansen solubility parameters (HSPs) were developed to determine whether one material can be dissolved in another and hence forms a homogeneous solution. The can also serve to determine the incompatibility of two materials.

Hansen solubility parameters (HSPs) consist of a set of three values: a dispersion component ($\delta D$), a polar component ($\delta P$) and a hydrogen bond-forming component ($\delta H$). These three components describe the forces that contribute to the cohesive energy density of a chemical compound, and enable a qualitative description beyond quantitative details of "hydrophobic", "polar" or "lipophilic".

By visualization of these three components as coordinates in a 3D diagram by means of the HSPiP software, version 5.0.04, programmed and sold by Prof. Stephen J. Abbott, Hiroshi Yamamoto and Charles Hansen (via www.hansen-solubility.com), the dissolution capacity of the materials can be determined and hence the Hansen space with its three Hansen solubility parameters can also be calculated. The centre of the Hansen space here constitutes the optimal dissolution capacity of all materials. The radius describes the limit of the Hansen space.

The determination of the Hansen space of the interface-active compounds was entrusted to the HSP-certified institute "VLCI—Van Loon Chemical Innovations BV, Science Park 408, 1098 XH Amsterdam, the Netherlands". The measurements thereof were conducted by means of an automated method (Formax High-Throughput Formulation System from Chemspeed) with low error limits.

The interface-active compounds were each stirred in 32 solvents at 800 rpm at 20° C. for 20 minutes. The concentration was 0.25 g/5 ml of solvent. This procedure was conducted in a fully automated manner by means of the Formax High-Throughput Formulation System. Subsequently, the dissolution capacity of the interface-active compounds was determined in the respective solvents.

The following solvents were used: acetonitrile, 1-bromonaphthalene, n-butyl acetate, γ-butyrolactone, cydohexanone, decamethylcyclopentasiloxane, dimethylformamide (DMF), dimethyl sulfoxide (DMSO), 1,4-dioxane, glycerol carbonate, n-hexane, methyl ethyl ketone (MEK), N-methylformamide, N-methyl-2-pyrrolidone (NMP), 2-phenoxyethanol, 2-propanol, propylene carbonate, propylene glycol, propylene glycol monomethyl ether, tetrahydrofuran (THF), toluene, benzyl benzoate, dimethylisosorbide, hexamethyldisiloxane, di(ethylene glycol) hexyl ether, 1,3-dioxolane, ethyl formate, 1-octanol, 1-methoxy-2-propyl acetate, acetone, ethyl acetate, ethylene glycol monobutyl ether.

The dissolution capacity is assessed according to the following six-level scale:

TABLE 1

| Solubility scale | Sediment | Turbidity |
| --- | --- | --- |
| 1 | no | no |
| 2 | no | slight |
| 3 | no | severe |
| 4 | a trace | severe |
| 5 | moderate | slight |
| 6 | complete | no |

The evaluation of the dissolution capacity of the interface-active compounds in the respective solvent is input into the HSPiP software, version 5.0.0.4, programmed and sold by Prof. Steven J Abbott, Hiroshi Yamamoto and Charles Hansen (available via www.hansen-solubility.com). It calculates and determines the Hansen space using these data.

Preferably, the interface-active compounds are chemical amphiphilic, ionic, nonionic compounds of low and/or high molecular weight that are within the above-detailed Hansen space according to the invention.

Preferably, the interface-active compounds are polyether-modified fatty acids, polyether-modified fatty acid amide amines, polyether-modified amine derivatives, Jeffamine derivatives, polyether-modified oils and fats and derivatives thereof.

Preferably, the interface-active compounds are phosphorylated polyether derivatives, especially based on fatty alcohols.

Preferably, the interface-active compounds are maleate resins and polyether-modified styrene-maleic acid copolymers. Maleate resins are Diels-Alder adducts of rosins with maleic acid or fumaric acid, which may also be wholly or partly esterified with polyhydric alcohols. Thus, it is possible to prepare a very wide range of hard resins having different melting points, functionalities and resultant solubilities.

Preferably, the interface-active compounds are polyesters modified with groups having pigment affinity.

Preferably, the interface-active compounds are nonionic ethoxylated sugar surfactants.

More preferably, they are polyoxyethylene sorbitan monolaurate, polyoxyethylene sorbitan monopalmitate, polyoxyethylene sorbitan monostearate, polyoxyethylene sorbitan monooleate, polyoxyethylene sorbitan tristearate.

It is possible with preference to use commercial fatty alcohol ethoxylates selected from the group of the polyalkylene glycol ethers.

Preferably, the interface-active compounds have one or more functionalities having an affinity for a pigment surface.

Suitable interface-active compounds having the required Hansen parameters are the products available from Evonik Industries AG, for example TECO® Dispers 652, TECO® Dispers 655, TECO® Dispers 673, TECO® Dispers 740W, TECO® Dispers 750.

The Erkamar 3260 product from Robert Kraemer GmbH & Co. KG is also suitable.

The organic pigments are preferably selected from the group of the azo, diazo, condensed azo, naphthol, metal complex, thioindigo, indanthrone, isoindanthrone, anthanthrone, anthraquinone, isodibenzanthrone, triphendioxazine, quinacridone, perylene, diketopyrrolopyrrole and phthalocyanine pigments.

Naphthol AS pigments are conventionally produced in batch processes. For the yield, coloristic quality and consistency of quality, it is necessary that the process parameters such as temperature, time, commixing and colourant concentration and the suspension concentration are maintained and controlled. Further difficulties also arise in batch processes on scale-up from laboratory scale to the industrial scale, since the tank and stirrer geometries or transfers of heat have a great effect on the primary particle size, grain size distribution.

Naphthol AS pigments are of particular industrial interest since they usually attain high colour intensities and cover the magenta region of the process colour set. In addition, they have good lighfastness.

DE 102004019560 A1, DE 602006017431 D1 describe the production of naphthol AS pigments and the use thereof in dispersions.

Preferably, the modified organic pigments comprise 2% to 70% by weight, preferably 5% to 50% by weight, more preferably 15% to 35% by weight, of interface-active compounds based on 100% by weight of the modified organic pigments.

The invention further provides the process for producing the modified organic pigments, wherein the interface-active compounds within the Hansen space according to the invention are added during the production of the organic pigments. The interface-active compounds can be added at any time during the production of the organic pigments.

The conventional production process for organic pigments is divided into the following component steps:
1. synthesizing the crude pigments
2. working up the crude pigments by washing and filtration
3. drying the crude pigments Preferably, the addition of the interface-active compounds takes place during the synthesis of the crude pigments, after the synthesis of the crude pigments or after the workup of the crude pigments. In any case, the modification preferably precedes the drying of the crude pigments.

The process according to the invention enabled the production of organic pigments with narrow particle size distribution. In addition, the modified organic pigments have improved dispersion properties. It is suspected that the interface-active compounds interact with the surface of the pigments owing to van der Waals forces. The interaction is so stable that it was possible to reduce or prevent agglomeration of the pigments.

Surprisingly, it is also possible by the process according to the invention to produce a defined particle size of the pigments via the juncture of addition of the interface-active compounds. It is no longer necessary to conduct any additional grinding operations on the crude pigments, which typically have to be implemented in the production of all kinds of coating systems.

By the process according to the invention, it is now possible to produce modified pigments having improved dispersion quality without costly and extensive retrofitting measures in the existing plants.

Preferably, the addition of the interface-active compounds is conducted in aqueous solution, preferably in alkaline solution at a pH of 8 to 9.

Preferably, in the production of naphthol AS pigments with 4-aminobenzamide, the weight ratio of the interface-active compounds to the 4-aminobenzamide is from 0.3:1 to 10:1, preferably 0.5:1 to 5:1, more preferably 0.35:1 to 3.5:1.

The invention also provides for the use of the modified organic pigments according to the invention for production of paints, varnishes, printing inks, coating materials, floor coatings, potting compounds and filling compounds.

Suitable paint systems into which the modified organic pigments according to the invention can be incorporated are any solventborne or aqueously formulated one-component or two-component paint systems (1K or 2K), but also solvent-free systems.

Examples of 1K paint systems are those based on alkyd, acrylate, styrene acrylate, epoxy, polyvinyl acetate, polyester or polyurethane binders. Any kind of curing is possible, for example by oxidative drying, physical drying, self-crosslinking, UV or electron beam curing or crosslinking by baking.

2K paint systems crosslink as a result of the addition of at least one hardener component. Frequently, however, crosslinking mechanisms are combined in order to achieve a better shelf life. All combinations of curing mechanisms are permissible here. For example, hydroxyl-containing polyesters or polyacrylate resins can be crosslinked with isocyanates or blocked isocyanates or melamine resins as 2K systems. Mention should further be made of epoxy systems, where the epoxy binder is reacted with an amine hardener.

The modified organic pigments according to the invention can be used in pigment pastes, coating materials, printing inks and/or printing varnishes in a concentration of 0.01% to 90.0% by weight, preferably of 0.5% to 35% by weight, and more preferably of 1% to 25% by weight, based on the application medium.

EXAMPLES

The subject-matter of the invention will be described by way of example below, without any intention that the invention be restricted to these illustrative embodiments.
Measurement Methods:

Parameters or measurements are preferably determined using the methods described hereinbelow. In particular, these methods were used in the examples of the present intellectual property right.
Application The tinted varnishes were applied with a spiral coating bar (100 µm, from TQC GmbH) to test charts (for example from Leneta, Opacity charts, Form 2A).

In order to assess the performance of the solids with regard to evolution of colour intensity and ease of dispersion, the colour intensity was obtained after drying at 50° C. for 24 h was subjected to a colour measurement.
Colorimetry The colour of the paint surfaces was measured with an X-Rite instrument (model: X-Rite SP 60). The values known as the L*a*b* values according to the CIE-Lab system (CIE=Commission Internationale de l'Eclairage) were determined for all samples. The CIE-Lab system is useful as a three-dimensional system for quantitative description of the colour loci. In this system, the colours green (negative a* values) and red (positive a* values) are plotted on one axis, and the colours blue (negative b* values) and yellow (positive b* values) on the axis arranged at right angles thereto. The value C* is formed from a* and b* as follows: $C^* = (a^{*2} + b^{*2})^{0.5}$ and is used to describe violet colour loci. The two axes cross at the achromatic point. The vertical axis (achromatic axis) is crucial for the brightness, varying from white (L=100) to black (L=0). The CIE-Lab system can be used to describe not just colour loci but also colour separations via the specification of the three coordinates.

Further Conditions

Where % figures are given in the context of the present invention, the figures in question are in weight % unless stated otherwise. In the case of compositions, the % figures are based on the entire composition unless stated otherwise. Where averages are reported hereinafter, these are number averages unless stated otherwise. Where measurement values are reported hereinafter, these values, unless stated otherwise, have been determined under a pressure of 101 325 Pa, at a temperature of 23° C. and the ambient relative atmospheric humidity of about 40%.
Chemicals and Materials Used

TABLE 2

| Interface-active compounds | | Company | Chemical name |
|---|---|---|---|
| M1 | TEGO ® Dispers 652 | Evonik Industries AG | Concentrate of a fatty acid derivative |
| M2 | TEGO ® Dispers 655 | Evonik Industries AG | Modified polyether having groups with pigment affinity |
| M3 | TEGO ® Dispers 673 | Evonik Industries AG | High molecular weight polymer |
| M4 | TEGO ® Dispers 740W | Evonik Industries AG | Nonionic modified fatty acid derivative, free of aromatics, amine and alkyl-phenol ethoxylate |
| M5 | TEGO ® Dispers 750 | Evonik Industries AG | Aqueous solution of an organic-modified polymer having groups with pigment affinity |
| M6 | Erkamar 3260 | Robert Kraemer GmbH & Co. KG | Maleate resin |
| VM | TEGO ® Dispers 685 | Evonik Industries AG | High molecular weight polymer |

TABLE 3

HSP values and distance from the centre of the Hansen space

| Interface-active compounds | dD | dP | dH | Distance from the centre of the Hansen space |
|---|---|---|---|---|
| M1 | 16.55 | 4.4 | 8.55 | 6.35 |
| M2 | 16.98 | 14.62 | 11.3 | 6.57 |
| M3 | 19.76 | 11.12 | 13.02 | 5.00 |
| M4 | 17.15 | 10.97 | 10.76 | 3.64 |
| M5 | 16.14 | 12.89 | 13.64 | 4.93 |
| M6 | 16.71 | 8.04 | 9.95 | 3.57 |
| VM | 17.07 | 7.77 | 6.58 | 6.71 |

Table 3 lists the coordinates of the interface-active compounds M1-M6 according to the invention with their respective distances from the centre of the defined Hansen space (D=18.21, P=8.44, H=13.16 with a radius of 6.7 units about the centre). M1-M6 are within the Hansen space.

Table 3 also shows the coordinates of the comparative example VM with a distance from the centre outside the Hansen space.

The distance from the centre of the Hansen space can be calculated by means of the vector geometry.

Vector geometry (also called "analytical geometry") is concerned with linear calculations in spaces and is known to those skilled in the art.

Figure 2:
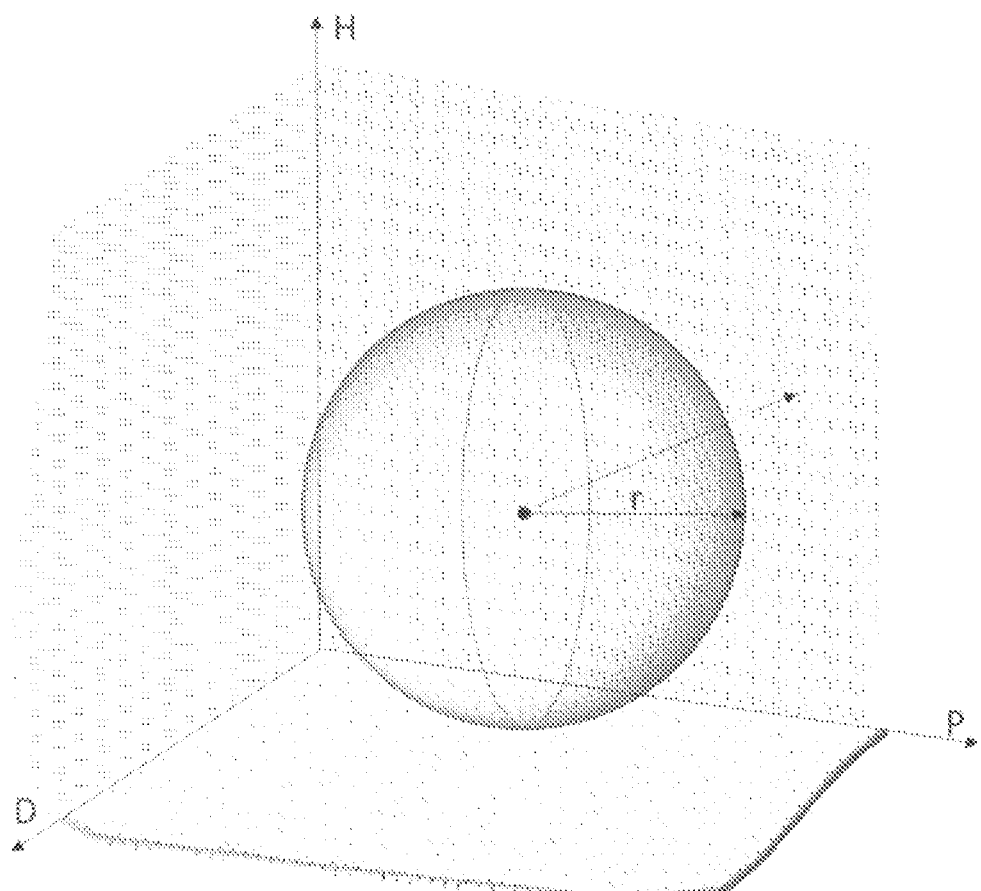
FIG. 2 shows a schematic of a compound outside the Hansen space (unlabelled arrow).

FIG. 2 shows a schematic of a compound outside the Hansen space (unlabelled arrow). The arrow labelled "r" shows the radius of the Hansen space from the centre.

1. Production of Modified Pigments According to the Invention

Two organic modified red naphthol AS pigments (PR266 and PR170) according to the invention were produced by three processes according to the invention. The production was based on the Organikum-Organisch-chemisches Grundpraktikum [Basic Practical Organic Chemistry], VEB Deutscher Verlag der Wissenschaften, Berlin 1990, pages 300, 370, 532, 547 et seq., 549.

The processes according to the invention differ in the juncture of addition of the interface-active compounds according to the invention.

1.1 Production Process 1 (HV1)

Production of a Modified Organic Pigment—Addition of the Interface-Active Compounds According to the Invention after the Synthesis To a solution consisting of 46.6 g of 4-aminobenzamide, 500 g of demineralized water, 86.6 g of conc. HCl and 50 g of sodium acetate were added dropwise while stirring at 5° C., over a period of 120 minutes, a solution of 100 g of 2-methoxy-3-hydroxy-2-naphthanilide (for PR266) or 104.78 g of N-(2-ethoxyphenyl)-3-hydroxy-2-naphthalenecarboxamide (for PR170), 150 g of NaOH (10%), 300 g of ethanol, 25 g of sodium nitrite and 75 g of demineralized water.

The suspension formed was stirred at 70° C. for a further 60 min. 186.4 g of NaOH (10%) were used to adjust it to pH>7. The interface-active compound according to the invention was added to the mixture in the weight ratio specified in Table 4 and Table 5. After homogenization for 30 minutes, the mixture was acidified to pH 5 with 10% HCl and the pigment was filtered off, washed and dried in an air circulation oven at 70° C. The modified pigment according to the invention was coarsely comminuted in a knife mill (Retsch Grindomix GM200) at 10 000 rpm for 10 seconds.

1.2 Production Process 2 (HV2)

Production of a modified organic pigment—addition of the interface-active compounds according to the invention during the synthesis.

The interface-active compounds according to the invention were added with the weight ratio specified in Table 4 or 5 to a solution consisting of 33.33 g of 2-methoxy-3-hydroxy-2-naphthanilide (for PR266) or 34.93 g of N-(2-ethoxyphenyl)-3-hydroxy-2-naphthalenecarboxamide (for PR170), 50 g of NaOH (10%), 100 g of ethanol, 8.33 g of sodium nitrite and 25 g of demineralized water. This mixture was added dropwise at 5° C. over a period of 120 min to a solution consisting of 15.47 g of 4-aminobenzamide, 166.67 g of demineralized water, 28.87 g of conc. HCl and 16.67 g of sodium acetate. The suspension formed was stirred at 70° C. for a further 60 min. The mixture was alkalized with 62.13 g of 10% NaOH.

After homogenization for 30 minutes, the mixture was acidified with 10% HCl and the pigment was filtered off, washed and dried in an air circulation oven at 70° C. The modified pigment according to the invention was coarsely comminuted in a knife mill (Retsch Grindomix GM200) at 10 000 rpm for 10 seconds.

1.3 Production Process 3 (HV3)

Production of a modified organic pigment—addition of the interface-active compounds according to the invention to the filtercake.

To a solution consisting of 46.6 g of 4-aminobenzamide, 500 g of demineralized water, 86.6 g of conc. HCl and 50 g of sodium acetate were added dropwise while stirring at 5° C., over a period of 120 minutes, a solution of 100 g of 2-methoxy-3-hydroxy-2-naphthanilide (for PR266) or 104.78 g of N-(2-ethoxyphenyl)-3-hydroxy-2-naphthalenecarboxamide (for PR170), 150 g of 10% NaOH, 300 g of ethanol, 25 g of sodium nitrite and 75 g of demineralized water.

The suspension formed was stirred at 70° C. for a further 60 min.

Thereafter, the pigment was filtered off and washed. The interface-active compound according to the invention was added to the filtercake in the weight ratio according to Table 4 or 5 and it was homogenized for 30 minutes. 10% HCl was used for acidification to a pH of 5, followed by drying in an air circulation oven at 70° C.

The modified pigment according to the invention was coarsely comminuted in a knife mill (Retsch Grindomix GM200) at 10 000 rpm for 10 seconds.

TABLE 4

For PR266

| Modified pigments | Weight ratio of interface-active compound to 4-aminobenzamide | Interface-active compound | HV 1 | HV 2 | HV 3 | Theoretical proportion by weight of interface-active compound in the pigment |
|---|---|---|---|---|---|---|
| P1 | 1.35:1 | M1 | x | | | 30 |
| P2 | 1.35:1 | M2 | | x | | 30 |
| P3 | 3.15:1 | M3 | x | | | 50 |
| P4 | 3.15:1 | M4 | | | x | 50 |
| P5 | 1.31:1 | M5 | | | x | 14.3 |
| P6 | 0.35:1 | M6 | | | x | 10 |
| VP1 | 1.35:1 | VM | | x | | 30, cannot be filtered off |
| VP2 | n/a | none | x | | | n/a |

TABLE 5

For PR170

| Modified pigments | Weight ratio of interface-active compound to 4-aminobenzamide | Interface-active compound | HV 1 | HV 2 | HV 3 | Theoretical proportion by weight of interface-active compound in the pigment |
|---|---|---|---|---|---|---|
| P10 | 1.43:1 | M1 | | | x | 30 |
| P11 | 1.43:1 | M2 | x | | | 30 |
| P12 | 3.33:1 | M3 | | x | | 50 |
| P13 | 3.33:1 | M4 | x | | | 50 |

TABLE 5-continued

For PR170

| Modified pigments | Weight ratio of interface-active compound to 4-aminobenzamide | Interface-active compound | HV 1 | HV 2 | HV 3 | Theoretical proportion by weight of interface-active compound in the pigment |
|---|---|---|---|---|---|---|
| P14 | 1.39:1 | M5 | | x | | 14.3 |
| P15 | 0.37:1 | M6 | | | x | 10 |
| VP3 | 1.43:1 | VM | x | | | 30, cannot be filtered off |
| VP4 | n/a | none | x | | | n/a |

Comparative pigments VP2 and VP4 were produced without addition of interface-active compound.

Comparative pigments VP1 and VP3 were prepared analogously to the production processes specified in Tables 4 and 5 with addition of VM (interface-active compound outside the Hansen space). Comparative pigments VP1 and VP3 could not be filtered off.

2. Application Examples

To verify the usability of the modified pigments according to the invention, they were used in various varnish systems at low and high shear energy and tested for their evolution of colour intensity and dispersibility.

The pigments were used in a water-thinnable white paint, in a concentrate and in a 2-component PU varnish. The paints and varnishes are compared with one another on the basis of colour intensity.

2.1 Production of a Water Thinnable White Paint

First of all, a water-thinnable white paint was produced according to the description in the Lehrbuch der Lacktechnologie [Paint Technology], 4th revised edition, by the authors Brock, Groeteklaes and Mischke, p. 222 et seq., and according to Table 6. Subsequently, the inventive pigments and comparative pigments were each incorporated in the white paint with low shear forces and with high shear forces.

a) Low Shear Energies were Introduced as Follows:

To 100 g of the water-thinnable white paint were added 2.5 g of inventive pigments or comparative pigments, and they were stirred in at a shear rate of 10 m/s by means of a DISPERMAT CV from Getzmann for 5 minutes.

b) High Shear Energies were Introduced as Follows:

To 100 g of the water-thinnable white paint were added 2.5 g of inventive pigments or comparative pigments, and dispersion was effected with a universal agitator (Hausschild Engineering, DAC 150 Dual Asymmetric Centrifuge) together with 2 mm glass beads in 250 ml screwtop glass bottles for 120 min. The glass beads were subsequently removed.

TABLE 6

Water-thinnable white paint

| Raw material | Manufacturer or CAS No. | Weight used [g] |
|---|---|---|
| Propylene glycol | 25322-69-4 | 11.3 |
| Water | Stadtwerke Essen AG | 15 |
| 2-Amino-2-methyl-1-propanol | 124-68-5 | 1 |
| Tego Foamex 830 | Evonik Industries AG | 1.2 |
| Tego Dispers 750W | Evonik Industries AG | 14.5 |
| Kronos 2310 titanium dioxide | KRONOS TITAN GmbH | 107 |
| Glass beads, diameter 2 mm | PAS Jablonec a.s | 175 |

TABLE 6-continued

Water-thinnable white paint

| Raw material | Manufacturer or CAS No. | Weight used [g] |
|---|---|---|
| Alberdingk AC2742, acrylate dispersion | Alberdingk Boley GmbH | 240 |
| Butylglycol | 111-76-2 | 14.5 |
| 3-Methoxy-1-butanol | 123-51-3 | 15.5 |
| Water | Stadtwerke Essen AG | 37 |
| Tego Viscoplus 3030 | Evonik Industries AG | 9 |
| | | 641 |

The composition was applied to test charts (Leneta charts) with a spiral coating bar (100 μm) and provided for colorimetry.

Table 7 shows the colour values measured. What is desired here is a minimum differential in the colour intensity $F^*$ between the paints with low shear energy and those with high shear energy. It is found that the inventive paints (L1, L3, L5) comprising the inventive pigments (P1, P3, P5) have a smaller differential than the comparative paints (VL2) comprising the comparative pigments (VP2).

The differential gives a statement as to the dispersibility of the pigments. It has been found that the pigments according to the invention do not require a high energy input for the paint to receive a good to very good colour intensity.

TABLE 7

Colorimetric measurements in the water-thinnable white paint

| Paint | Pigment | Shear energies | L* | a* | b* | Y | F | F* |
|---|---|---|---|---|---|---|---|---|
| VL2 | VP2 | high | 77.08 | 18.81 | 1.54 | 51.67 | 22.61 | 100 |
| VL2* | VP2 | low | 84.49 | 6.95 | 4.92 | 65.01 | 9.41 | 41.6 |
| L1 | P1 | high | 73.75 | 26.41 | 1.53 | 46.32 | 31.11 | 100 |
| L1* | P1 | low | 77.92 | 19.07 | 2.15 | 53.08 | 20.74 | 66.7 |
| L3 | P3 | high | 76.13 | 23.42 | 2.47 | 50.10 | 24.85 | 100 |
| L3* | P3 | low | 77.46 | 20.07 | 2.44 | 52.30 | 21.75 | 87.5 |
| L5 | P5 | high | 72.44 | 26.9 | 0.32 | 44.32 | 34.98 | 100 |
| L5* | P5 | low | 72.94 | 24.74 | −0.02 | 45.07 | 33.47 | 95.7 |

2.2 Production of a Concentrate

Another typical case may be that the pigments are processed to a concentrate in order to enable flexible and variable production by holding various shades in stock. The inventive pigments and comparative pigments were therefore tested as concentrates with low and high shear forces:

25 g of inventive pigment or comparative pigment and 75 g of water were stirred in at a shear rate of 3 m/s by means of a DISPERMAT CV from Getzmann for 10 minutes.

aa) Production of Concentrates with Low Shear Forces:

To 10 g of dispersion formed were added 100 g of the water-thinnable white paint, and they were stirred in at a shear rate of 3 m/s by means of a DISPERMAT CV from Getzmann for 2 minutes.

bb) Production of Concentrates with High Shear Forces:

To 10 g of the dispersion formed were added 100 g of the water-thinnable white paint, and dispersion was effected with a universal agitator (Hausschild Engineering, DAC 150 Dual Asymmetric Centrifuge) together with 2 mm glass beads in 250 ml screwtop glass bottles for 120 min. The glass beads were subsequently removed.

The compositions produced were applied as in the example of the water-thinnable white paint and evaluated by colorimetry.

TABLE 8

Colorimetric measurements for the concentrate

| Concentrate | Solids | Shear energies | L* | a* | b* | Y | F | F* |
|---|---|---|---|---|---|---|---|---|
| VK4 | VP4 | high | 71.19 | 26.98 | 0 | 42.47 | 38.98 | 100 |
| VK4* | VP4 | low | 85.56 | 7.11 | 4.99 | 67.11 | 8.06 | 20.68 |
| K10 | P10 | high | 72 | 26.87 | 0.02 | 43.66 | 36.35 | 100 |
| K10* | P10 | low | 71.02 | 25.57 | 0.07 | 42.22 | 39.55 | 108.78 |
| K14 | P14 | high | 72.69 | 26.33 | 0.05 | 44.69 | 34.22 | 100 |
| K14* | P14 | low | 72.94 | 24.74 | −0.02 | 45.07 | 33.47 | 97.80 |
| K16 | P15 | high | 71.99 | 26.67 | −0.02 | 43.64 | 36.38 | 100 |
| K16* | P15 | low | 70.57 | 26.69 | −0.09 | 41.57 | 41.08 | 112.89 |

It was found that the inventive concentrates (K10, K14, K16) comprising the inventive pigments (P10, P14, P15) exhibited an elevated colour intensity F* when relatively low shear energies were used compared to the comparative concentrate (VK4) comprising the comparative pigment (VP4).

2.3 Production of Two-Component Polyurethane Varnish (2K PU Varnish)

A two-component polyurethane varnish according to Table 9 was produced.

TABLE 9

White two-component polyurethane varnish

| | Raw materials | Weight in g |
|---|---|---|
| 1 | Desmophen ® AVPLS 2350 binder (from Bayer AG) | 462.0 |
| 2 | KRONOS ®2310 titanium dioxide (from KRONOS Int.) | 369.6 |
| 3 | Xylene | 25.0 |
| 4 | Methoxypropyl acetate (MPA) | 25.0 |
| 5 | Butyl acetate (BuAc) | 25.0 |
| | The aforementioned five components are dispersed in a 2 l dispersing vessel together with 700 g of beads at 10 m/s for 2 hours, and then the other components (6. and 7.) are added. | |
| 6 | TIB KAT ® 219 catalyst (81% in xylene) (TIB Chemicals) | 13.4 |
| 7 | Xylene/MPA/BuAc 1:1:1 solvent mixture | 76.2 | aaa) Production of the 2K PU Varnishes with Low Shear Forces:

For the curing of the system, 85.5 g of the 2K polyurethane varnish produced were mixed with 14.5 g of Desmodur® N 3390 BA (Bayer) as hardener component.

To this mixture were added 2.5 g of inventive pigment or comparative pigment, which were then stirred in at a shear velocity of 3 m/s by means of a DISPERMAT CV from Getzmann for 10 minutes. After application and a flash-off time of 10 minutes at room temperature, followed by forced drying at 60° C. for 30 minutes, the colorimetric analysis was effected.

bbb) Production of the 2K PU Varnishes with High Shear Forces:

2.5 g of inventive pigment or comparative pigment were added to 85.5 g of the 2K polyurethane varnish produced, and dispersion was effected with a universal agitator (Hausschild Engineering, DAC 150 Dual Asymmetric Centrifuge) together with 2 mm glass beads in 250 ml screwtop glass bottles for 120 min. The glass beads were subsequently removed.

14.5 g of hardener component in the form of Desmodur® N 3390 BA (Bayer) were added and the mixture was stirred at a shear rate of 3 m/s by means of a DISPERMAT CV from Getzmann for 10 minutes.

TABLE 10

Colorimetric measurements on the 2K PU varnish

| PU varnishes | Solids | Shear energies | L* | a* | b* | Y | F | F* |
|---|---|---|---|---|---|---|---|---|
| VL4 | VP4 | high | 63.33 | 28 | 0.36 | 31.98 | 72.32 | 100.00 |
| VL4* | VP4 | low | 71.44 | 24.3 | 1.05 | 42.83 | 38.15 | 52.76 |

TABLE 10-continued

Colorimetric measurements on the 2K PU varnish

| PU varnishes | Solids | Shear energies | L* | a* | b* | Y | F | F* |
|---|---|---|---|---|---|---|---|---|
| L10 | P10 | high | 63.01 | 27.99 | 0.56 | 31.60 | 74.03 | 100.00 |
| L10* | P10 | low | 65.23 | 27.71 | 0.32 | 34.34 | 62.78 | 84.80 |
| L14 | P14 | high | 62.79 | 28.35 | 0.24 | 31.34 | 75.23 | 100.00 |
| L14* | P14 | low | 62.89 | 28.12 | 0.19 | 31.46 | 74.68 | 99.27 |
| L16 | P16 | high | 62.85 | 27.89 | 0.57 | 31.41 | 74.90 | 100.00 |
| L16* | P16 | low | 63.57 | 27.94 | 0.45 | 32.28 | 71.05 | 94.86 |

The PU varnishes (L10, L14, L16) comprising the inventive pigments P10, P14 and P16 had higher colour intensity than that of the comparative PU varnishes (VL4) comprising the comparative pigment VP4. More particularly, it can be inferred from Table 9 that the pigments according to the invention had good to very good dispersibility, since there were barely any perceptible differences in colour intensity between a varnish with high and low shear energy.

3. Physical Examples

FIG. 3 shows the dispersibility of the pigments according to the invention in water. In the left-hand beaker, the comparative pigment VP2 (without interface-active compound) was added to water. The comparative pigment VP2 floated on the surface of the water. In the right-hand beaker, VP2 and the interface-active compound M6 were added to water. Here too, VP2 floated on the surface of the water. The middle beaker showed the modified pigment P6 according to the invention in water. Without stirring, it already had good dispersibility in water.

European patent application 17183262.9 filed Jul. 26, 2017, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A process for producing a modified organic pigment, the process comprising:
   1) providing a crude pigment;
   2) Working up the crude pigment by washing and filtration;
   3) Drying the crude pigment; and
   4) Adding an interface-active compound before said 3) drying,
wherein said modified organic pigment is naphthol AS and said interface-active compound is a compound within a three-dimensional Hansen space determined by three coordinates, Hansen solubility parameters (HSPs), D=18.21, P=8.44, H=13.16 with a radius of 6.7 units about a center of the three-dimensional Hansen space,
determined with the aid of the HSPIP software, version 5.0.0.4.

2. The process for producing a modified organic pigment according to claim 1, wherein
   the interface-active compound is at least one member selected from the group consisting of a chemical amphiphilic compound of low molecular weight, a chemical amphiphilic compound of high molecular weight, an ionic compound of low molecular weight, an ionic compound of high molecular weight, a nonionic compound of low molecular weight, and a nonionic compound of high molecular weight.

3. The process for producing a modified organic pigment according to claim 1, wherein
   the interface-active compound is at least one member selected from the group consisting of a polyether-modified fatty acid, a polyether-modified fatty acid amide amine, a polyether-modified amine derivative, a Jeffamine derivative, a polyether-modified oil and fat, and a derivative of a polyether-modified oil and fat.

4. The process for producing a modified organic pigment according to claim 1, wherein
   the interface-active compound is a phosphorylated polyether derivative.

5. The process for producing a modified organic pigment according to claim 1, wherein
   the interface-active compound is at least one member selected from the group consisting of a polyether-modified styrene-maleic acid copolymer and a maleate resin.

6. The process for producing a modified organic pigment according to claim 1, wherein
   the surface-active compound has one or more functionalities having an affinity for a surface of the organic pigment.

7. The process for producing a modified organic pigment according to claim 1, which comprises 5% to 50% by weight of the interface-active compound, based on 100% by weight of the modified organic pigment.

8. The process according to claim 1, wherein
   said 4) adding takes place during a synthesis which is before said 3) drying.

9. The process according to claim 1, wherein
   said 4) adding is conducted in an aqueous solution.

10. A process of making a pigment preparation, the process comprising:
   producing a modified organic pigment according to claim 1; and
   mixing a modified organic pigment obtained thereby into a pigment precursor composition.

11. A process of making a composition comprising a modified organic pigment obtained by reacting an organic pigment during organic pigment synthesis with at least one interface-active compound,
   wherein the interface-active compound is a compound within a three-dimensional Hansen space determined by three coordinates, Hansen solubility parameters (HSPs), D=18.21, P=8.44, H=13.16 with a radius of 6.7 units about a center of the three-dimensional Hansen space,
   determined with the aid of the HSPIP software, version 5.0.0.4, the process comprising:
   mixing the modified organic pigment in a member selected from the group consisting of a paint precursor composition, a varnish precursor composition, a printing ink precursor composition, a coating material precursor composition, a floor coating precursor composition, a potting compound precursor composition, and a filling compound precursor composition, wherein said modified organic pigment is naphthol AS.

12. The process for producing a modified organic pigment according to claim 1, which comprises 10% to 40% by weight of the interface-active compound, based on 100% by weight of the modified organic pigment.

13. The process for producing a modified organic pigment according to claim 1, which comprises 14% to 35% by weight of the interface-active compound, based on 100% by weight of the modified organic pigment.

14. The process according to claim 1, wherein said 4) adding is conducted in an alkaline solution.

15. The process according to claim 1, wherein said interface-active compound is added during a synthesis, after a synthesis or after said 2) working up, which are before said 3) drying.

* * * * *